United States Patent
Song et al.

(10) Patent No.: US 11,223,644 B2
(45) Date of Patent: Jan. 11, 2022

(54) GRAPHICAL STRUCTURE MODEL-BASED PREVENTION AND CONTROL OF ABNORMAL ACCOUNTS

(71) Applicant: Advanced New Technologies Co., Ltd., Grand Cayman (KY)

(72) Inventors: Le Song, Hangzhou (CN); Hui Li, Hangzhou (CN); Zhibang Ge, Hangzhou (CN); Xin Huang, Hangzhou (CN); Chunyang Wen, Hangzhou (CN); Lin Wang, Hangzhou (CN); Tao Jiang, Hangzhou (CN); Yiguang Wang, Hangzhou (CN); Xiaofu Chang, Hangzhou (CN); Guanyin Zhu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/231,693

(22) Filed: Apr. 15, 2021

(65) Prior Publication Data
US 2021/0234881 A1 Jul. 29, 2021

Related U.S. Application Data

(63) Continuation of application No. 16/809,308, filed on Mar. 4, 2020, now Pat. No. 11,102,230, which is a
(Continued)

(30) Foreign Application Priority Data

Dec. 15, 2017 (CN) .......................... 201711349601.3

(51) Int. Cl.
*G06F 30/27* (2020.01)
*H04L 29/06* (2006.01)
(Continued)

(52) U.S. Cl.
CPC .......... *H04L 63/1425* (2013.01); *G06F 17/11* (2013.01); *G06F 30/27* (2020.01); *G06N 5/02* (2013.01); *G06N 5/04* (2013.01)

(58) Field of Classification Search
CPC ...... H04L 63/1425; G06F 30/27; G06F 17/11; G06F 16/2365; G06N 5/02; G06N 5/04;
(Continued)

(56) References Cited

U.S. PATENT DOCUMENTS

| 2004/0044894 A1 | 3/2004 | Lofgren et al. |
| 2009/0018940 A1 | 1/2009 | Wang et al. |

(Continued)

FOREIGN PATENT DOCUMENTS

| CN | 1358288 | 7/2002 |
| CN | 1961525 | 5/2007 |

(Continued)

OTHER PUBLICATIONS

Chen, "The Detection of Anomaly Accounts Based on Behavior Analysis for Social Networks", Thesis for the degree of Maters of Information Security, Beijing Jiaotong University, Jun. 2016, 67 pages (with English Abstract).
(Continued)

*Primary Examiner* — Kandasamy Thangavelu
(74) *Attorney, Agent, or Firm* — Fish & Richardson P.C.

(57) ABSTRACT

A graphical structure model trained with labeled samples is obtained. The graphical structure model is defined based on an account relationship network that comprises a plurality of nodes and edges. The edges correspond to relationships between adjacent nodes. Each labeled sample comprises a label indicating whether a corresponding node is an abnormal node. The graphical structure model is configured to iteratively calculate, for at least one node of the plurality of nodes, an embedding vector in a hidden feature space based
(Continued)

on an original feature of the least one node and/or a feature of an edge associated with the at least one node. A first embedding vector that corresponds to a to-be-tested sample is calculated using the graphical structure model. Abnormal account prevention and control is performed on the to-be-tested sample based on the first embedding vector.

20 Claims, 4 Drawing Sheets

Related U.S. Application Data continuation of application No. PCT/CN2018/104930, filed on Sep. 11, 2018.

(51) Int. Cl.
*G06F 17/11* (2006.01)
*G06N 5/02* (2006.01)
*G06N 5/04* (2006.01)

(58) Field of Classification Search
CPC ........ G06N 3/04; G06N 3/0454; G06N 3/084; G06K 9/6257; G06Q 40/02
See application file for complete search history.

(56) References Cited

U.S. PATENT DOCUMENTS

| | | | |
|---|---|---|---|
| 2011/0035347 | A1 | 2/2011 | Shama et al. |
| 2014/0337972 | A1 | 11/2014 | Foster et al. |
| 2015/0082448 | A1 | 3/2015 | Elovici et al. |
| 2015/0188941 | A1 | 7/2015 | Boshmaf et al. |
| 2016/0300059 | A1 | 10/2016 | Abrams et al. |
| 2016/0359881 | A1 | 12/2016 | Yadav et al. |
| 2018/0012302 | A1 | 1/2018 | Jin et al. |
| 2018/0046939 | A1 | 2/2018 | Meron et al. |
| 2020/0202219 | A1* | 6/2020 | Song ............... G06N 3/0481 |
| 2020/0204577 | A1 | 6/2020 | Song et al. |
| 2020/0394707 | A1* | 12/2020 | Guo ............... G06K 9/6257 |

FOREIGN PATENT DOCUMENTS

| | | | |
|---|---|---|---|
| CN | 101448007 | 6/2009 | |
| CN | 103605791 | 2/2014 | |
| CN | 104468463 | 3/2015 | |
| CN | 104519031 | 4/2015 | |
| CN | 104954350 | 9/2015 | |
| CN | 105208009 | 12/2015 | |
| CN | 105224507 | 1/2016 | |
| CN | 105357189 | 2/2016 | |
| CN | 105447028 | 3/2016 | |
| CN | 106327209 | 1/2017 | |
| CN | 106372938 | 2/2017 | |
| CN | 106549974 | 3/2017 | |
| CN | 106803168 | 6/2017 | |
| CN | 106843941 | 6/2017 | |
| CN | 107133865 | 9/2017 | |
| CN | 107305611 | 10/2017 | |
| CN | 107358075 | 11/2017 | |
| CN | 107392456 | 11/2017 | |
| CN | 112348660 A * | 2/2021 | ........... G06N 3/0454 |
| CN | 112435034 A * | 3/2021 | |
| CN | 112465411 A * | 3/2021 | |
| CN | 112581261 A * | 3/2021 | |
| JP | 2017091516 | 5/2017 | |
| TW | I466706 | 1/2015 | |
| WO | WO 2011019731 | 2/2011 | |
| WO | WO 2019114434 A1 * | 6/2019 | ......... G06F 16/2365 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Kezhan, "Characteristic Analysis and Classification Detection of Online Social Network Users", Thesis for the degree of Masters in Software Engineering, Hebei Normal University, Aug. 2016, 74 pages (with English Abstract).

Nakamoto. "Bitcoin: A Peer-to-Peer Electronic Cash System," www.bitcoin.org, 2005, 9 pages.

PCT International Preliminary Report on Patentability in International Application No. PCT/CN2018/104930, dated Jun. 16, 2020, 8 pages (with partial English translation).

* cited by examiner

GRAPHICAL STRUCTURE MODEL-BASED PREVENTION AND CONTROL OF ABNORMAL ACCOUNTS

CROSS-REFERENCE TO RELATED APPLICATIONS

This application is a continuation of and claims the benefit of priority of U.S. patent application Ser. No. 16/809,308, filed Mar. 4, 2020, which is a continuation of PCT Application No. PCT/CN2018/104930, filed on Sep. 11, 2018, which claims priority to Chinese Patent Application No. 201711349601.3, filed on Dec. 15, 2017, and each application is hereby incorporated by reference in its entirety.

TECHNICAL FIELD

The present disclosure relates to the field of computer software technologies, and in particular, to a method, an apparatus, and a device for abnormal account prevention and control based on a graphical structure model.

BACKGROUND

With the rapid development of computer and Internet technologies, many services can be implemented online. To use these services, a user needs to register corresponding accounts, such as an e-commerce platform account, a third-party payment platform account, and a forum platform account.

For bad purposes, some users or organizations automatically register accounts and perform real-name authentication in batches by using machines. These abnormal accounts can bring risks to a platform and are of low value to the platform.

In the existing technologies, these abnormal accounts are generally processed accordingly after being reported by users, such as freezing or cancellation.

SUMMARY

Implementations of the present specification provide a method, an apparatus, and a device for abnormal account prevention and control based on a graphical structure model, to alleviate the problem: lack of effective abnormal account prevention and control method.

To alleviate the previous technical problem, the implementations of the present specification are implemented as described below.

An implementation of the present specification provides a method for abnormal account prevention and control based on a graphical structure model, including:

obtaining a graphical structure model trained by using labeled samples, where the graphical structure model is defined based on an account relationship network, and the account relationship network includes one or more nodes in an account, device information, network information, location information, and identity information, and relationships between the nodes; the graphical structure model is used to calculate an embedding vector of the node after multiple iterations in a hidden feature space based on original features of the nodes and/or features of associated edges between the nodes; calculating, by using the trained graphical structure model, an embedding vector that corresponds to a to-be-tested sample; and performing abnormal account prevention and control on the to-be-tested sample based on the embedding vector that corresponds to the to-be-tested sample; where the labeled samples are labeled with information indicating whether a node that corresponds to the labeled sample is an abnormal node.

An implementation of the present specification provides an apparatus for abnormal account prevention and control based on a graphical structure model, including: an acquisition module, configured to obtain a graphical structure model trained by using labeled samples, where the graphical structure model is defined based on an account relationship network, and the account relationship network includes one or more nodes in an account, device information, network information, location information, and identity information, and relationships between the nodes; the graphical structure model is used to calculate an embedding vector of the node after multiple iterations in a hidden feature space based on original features of the nodes and/or features of associated edges between the nodes; a calculation module, configured to calculate, by using the trained graphical structure model, an embedding vector that corresponds to a to-be-tested sample; and a prevention and control module, configured to perform abnormal account prevention and control on the to-be-tested sample based on the embedding vector that corresponds to the to-be-tested sample; where the labeled samples are labeled with information indicating whether a node that corresponds to the labeled sample is an abnormal node.

An implementation of the present specification provides a device for abnormal account prevention and control based on a graphical structure model, including: at least one processor; and a memory communicatively connected to the at least one processor; where the memory stores an instruction that can be executed by the at least one processor, and the instruction is executed by the at least one processor, to enable the at least one processor to: obtain a graphical structure model trained by using labeled samples, where the graphical structure model is defined based on an account relationship network, and the account relationship network includes one or more nodes in an account, device information, network information, location information, and identity information, and relationships between the nodes; the graphical structure model is used to calculate an embedding vector of the node after multiple iterations in a hidden feature space based on original features of the nodes and/or features of associated edges between the nodes; calculate, by using the trained graphical structure model, an embedding vector that corresponds to a to-be-tested sample; and perform abnormal account prevention and control on the to-be-tested sample based on the embedding vector that corresponds to the to-be-tested sample; where the labeled samples are labeled with information indicating whether a node that corresponds to the labeled sample is an abnormal node.

The previous at least one technical solution used in the implementations of the present specification can achieve the following beneficial effects: effectively integrating a structure feature, a node feature, and an edge feature of an account relationship network, calculating an embedding vector and/or a prediction probability that corresponds to a node, and effectively performing abnormal account prevention and control on the node based on the embedding vector and/or the prediction probability.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Implementations of the present specification provide a graphical structure model training method, apparatus, and device, and a method, an apparatus, and a device for abnormal account prevention and control based on a graphical structure model.

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present application. All other implementations obtained by a person of ordinary skill in the art based on the implementations of the present specification without creative efforts shall fall within the protection scope of the present application.

Most companies have their own account systems. A good account system is the premise of normal service operation. As described in the background, there are some individuals and organizations in the real world that automatically register accounts and perform authentication in batches. If this type of abnormal accounts cannot be prevented and controlled in time, they will not only disturb the platform's account ecology, increase unnecessary calculation and storage overhead, but also provide other possibilities for these accounts to do bad things.

In a registration or authentication process, an account usually relies on some devices, network, and identity media, such as an international mobile equipment identity (IMEI), an international mobile subscriber identity (IMSI), an Internet Protocol (IP) address, a media access control (MAC) address, a mobile phone number, an email address, and an identity card number. Therefore, effectively extracting useful features from such data becomes a key to the previous technical problem. The solution provided in the present disclosure can effectively integrate network features associated with different media in a process of user registration and/or authentication, automatically learn relatively effective node features and edge features based on a graphical structure model, and perform abnormal account prevention and control accordingly.

Figure 1:
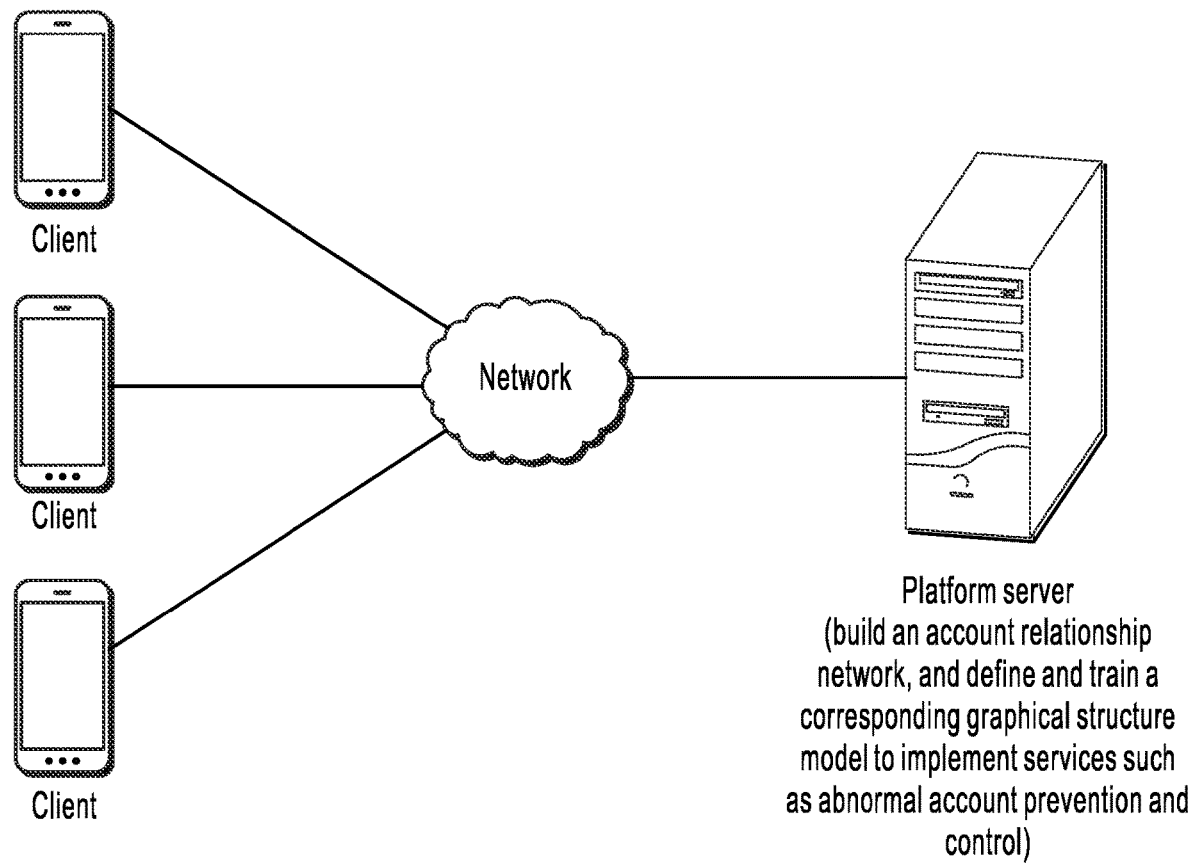
FIG. 1 is a schematic diagram illustrating an overall architecture involved in an actual application scenario of a solution in the present specification.

FIG. 1 is a schematic diagram illustrating an overall architecture involved in an actual application scenario of a solution in the present specification. The overall architecture involves two parts: a client and a platform server. The platform server can include one or more devices. The platform server builds an account relationship network based on data relating to previous account registration and/or authentication at the client, and defines and trains a corresponding graphical structure model for abnormal account prevention and control.

The following describes the solution in the present specification in detail based on the architecture in FIG. 1.

Figure 2:
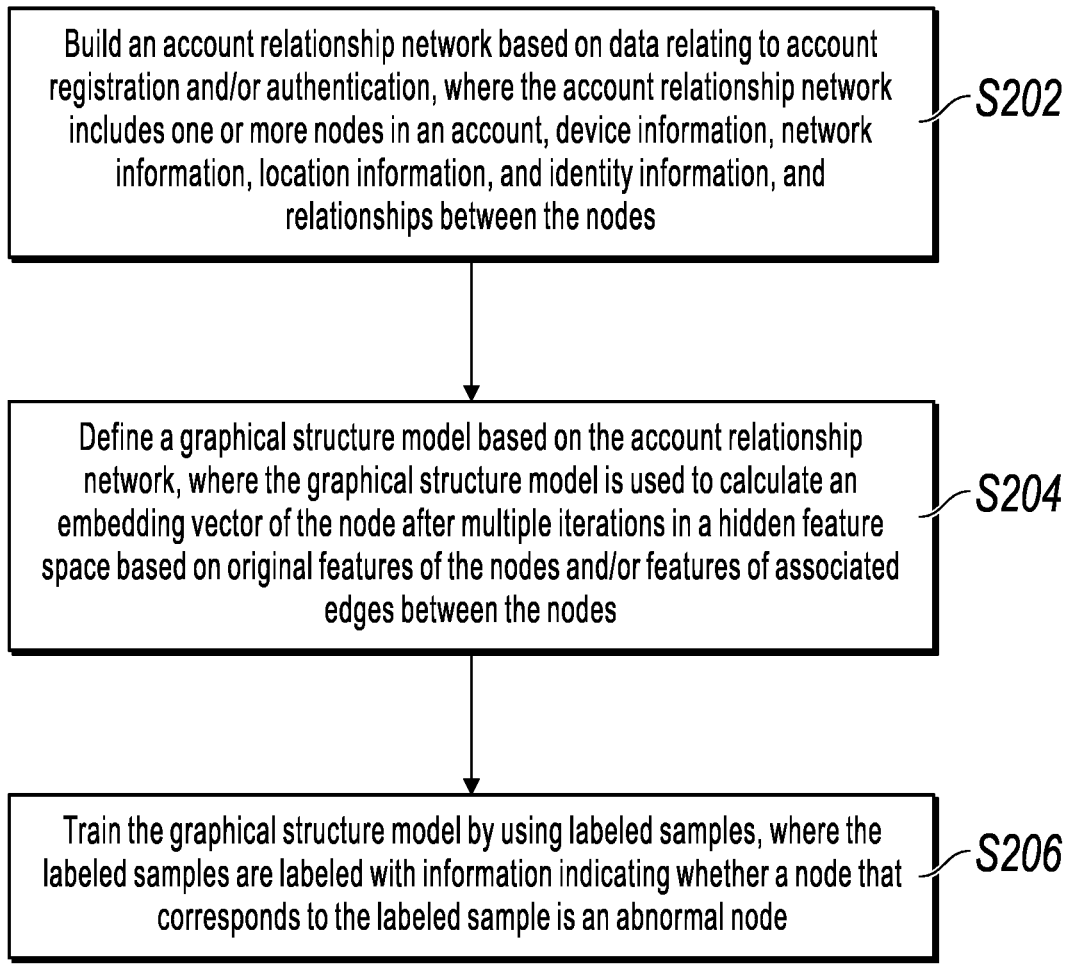
FIG. 2 is a schematic flowchart illustrating a graphical structure model training method, according to an implementation of the present specification.

FIG. 2 is a schematic flowchart illustrating a graphical structure model training method, according to an implementation of the present specification. The procedure in FIG. 2 includes the following steps:

S202. Build an account relationship network based on data relating to account registration and/or authentication, where the account relationship network includes one or more nodes in an account, device information, network information, location information, and identity information, and relationships between the nodes.

In one implementation of the present specification, authentication can include real-name authentication of an account, login authentication of an account, etc.

Other nodes such as device information, network information, location information, and identity information are data involved in account registration and/or authentication, for example, an IMEI of user equipment used during account registration and/or authentication, an IP address of the user equipment, global positioning system (GPS) positioning information of the user equipment, and an identity card number filled in by the user. The examples provide specific examples of several types of nodes. Certainly, they are not unique. For example, the device information can be an IMSI, a MAC address, or a device model. The network information can be router information, Wi-Fi hotspot information, etc. The location information can be base station positioning information, etc. The identity information can be a mobile phone number, an email address, or a bank card number.

In the implementation of the present specification, the account relationship can include a relationship between accounts, or can include a relationship between an account and the other types of nodes.

The account relationship network can include one network or a combination of multiple heterogeneous networks, and can be built based on an actual requirement.

For example, the account relationship network is an association network of an account and an IMEI. Correspondingly, a network node can indicate an account or an IMEI, and an edge can indicate that the IMEI is an IMEI of a device used during account registration and/or authentication. Similarly, there can be an association network of an account and a MAC address, an association network of an account and an IP address, an association network of an account and a mobile phone number, an association network of an account and an IMSI, an association network of an account and an email address, an association network of an account and an identity card number, an association network of an account and a bank card number, and an association network of an account and location information.

In the implementation of the present specification, the account relationship network is graph data, which is intuitively and easily processed by using a graph algorithm, and is relatively efficient.

Nodes in the account relationship network can include original features. The original feature can include at least one of the following types of data: node type, the number of registered accounts, the number of authenticated accounts, the number of abnormal accounts, time-related statistical data, etc. Several types of original features other than the node type are mainly for other types of nodes than the account. For example, the original features of the node include: the number of registered accounts that corresponds to the node within a specific time (for example, recent several days), the number of days in which the node has a registration behavior, distribution data of time that corresponds to the registration behavior in 24 hours, the number of logged in accounts, the number of days in which a login behavior is performed, distribution data of time that corresponds to the login behavior in 24 hours, the number of associated abnormal accounts, the proportion of days in which the abnormal account is logged in by using the node to the total number of login days, etc.

Edges in the account relationship network can include an association feature between nodes connected to the edge, and generally includes at least one of the following: behavior occurrence time, behavior consumption time, and behavior failure times. The behavior includes a registration behavior and/or an authentication behavior, such as account registration time or login time code (the code indicates, for example, the account is registered or logged in which hour within 24 hours), the total duration consumed by the account registration behavior from start to end, time that account registration stays in each jump behavior, and the number of account registration failures.

S204. Define a graphical structure model based on the account relationship network, where the graphical structure model is used to calculate an embedding vector of the node after multiple iterations in a hidden feature space based on original features of the nodes and/or features of associated edges between the nodes.

In the implementation of the present specification, an original feature and an edge feature of a node in the account relationship network can be integrated to define a feature space. Further, a graphical structure model is defined based on one or more feature spaces, a to-be-determined weight matrix of the feature space, and a specified nonlinear transform function.

The weight matrix is used to perform linear transformation on the feature space, and the nonlinear transform function is used to perform nonlinear transformation on the feature space, so by using the graphical structure model, the original feature and the edge feature of the node can be complexly mapped to a more complex hidden feature space. The embedding vector reflects a feature that is embedded by the corresponding node in the final hidden feature space.

In the case of multiple iterations, the feature space can also be defined based on a previous iteration result, and the feature space can also be considered as a hidden feature space compared with the feature space defined based on the original feature or the edge feature of the node.

Based on the above analysis, the embedding vector of the node after each iteration in the hidden feature space can be calculated based on one or more of the following factors: the original feature of the node, a feature of an edge of the node that is associated with another node, and an embedding vector of the node in a previous iteration or after multiple iterations in the hidden feature space.

S208. Train the graphical structure model by using labeled samples, where the labeled samples are labeled with information indicating whether a node that corresponds to the labeled sample is an abnormal node.

In the implementation of the present specification, whether some existing samples are abnormal samples can be labeled in advance, to train the graphical structure model. Any sample can correspond to one node in the graphical structure model. A node that corresponds to an abnormal sample is an abnormal node. In a scenario of abnormal account prevention and control, a sample is usually a labeled account. Certainly, the sample can also refer to another element involved in account registration and/or authentication of the user, for example, device information of a client used during registration or authentication, or entered identity information. These elements can also be used as nodes in the graphical structure model.

The following implementations are mainly described by using an example that a sample is an account. Generally, a sample can be labeled based on the actual complaint punishment or manual review result. In the actual service, the sample can be labeled once a day, once several days, etc.

The criteria for labeling can be defined based on actual requirements. For example, if it is determined that abnormal behaviors such as abnormal authentication, fake sales, and batch login/registration occur on a certain account, the account and related elements can be labeled as abnormal samples (that is, abnormal nodes in the graphical structure model), etc.

In the implementation of the present specification, the graphical structure model is trained to determine a proper weight matrix, so an embedding vector calculated based on the trained graphical structure model can truly express a property of a node as much as possible that corresponds to the embedding vector, for example, whether the node is an abnormal node.

In the method of FIG. 2, structure features, node features, and edge features of heterogeneous or homogeneous account relationship networks can be effectively integrated, a graphical structure model is defined and trained, and an embedding vector of a node in a hidden feature space is calculated based on the graphical structure model, so as to perform abnormal account control on the node.

Based on the method in FIG. 2, an implementation of the present specification further provides some specific implementation solutions and extension solutions of the method, which are described below.

In the implementation of the present specification, the graphical structure model is further used to calculate a prediction probability of the node based on the embedding vector. In the case of abnormal account prevention and control, the prediction probability can indicate the probability that the node is an abnormal node.

In the implementation of the present specification, intuitively an example is used to describe the definition and training process of the graphical structure model. Assume that T represents iteration times, there are n nodes in total, $y_i$ represents a labeling result of an $i^{th}$ node (for example, an abnormal node is labeled as 1, and a non-abnormal node is labeled as 0), $F_i$ represents an original feature of the $i^{th}$ node (feature dimensions are f dimensions), $E_{ij}$ represents a feature of an edge of the $i^{th}$ node that is associated with a $j^{th}$ node (feature dimensions are e dimensions), $N_i$ represents a set including neighboring nodes of the $i^{th}$ node, dimensions that need to be finally embedded into the hidden feature space are h dimensions, and $H_i^t$ represents an embedding vector of the $i^{th}$ node after the $i^{th}$ iteration in the hidden feature space.

Assume that an embedding vector of the node after the $t^{th}$ iteration in the hidden feature space is calculated based on the original feature of the node, a feature of an edge of the node that is associated with another node, and an embedding vector of the node after the $(t-1)^{th}$ iteration in the hidden feature space. An example graphical structure model is defined as follows:

"Initialize $W_1$ (h*f dimensions), $W_2$ (h*e dimensions), $W_3$ (h*h dimensions), and $W_4$ (h*2 dimensions), for example, using standard Gaussian distribution;
for t=1 to T://T iterations to be executed
    for i=0 to n-1://traversal among n nodes $$H_i^t = \sigma\left(W_1 F_i + W_2 \sum_{j \in N_i} E_{ij} + W_3 \sum_{j \in N_i} \alpha_{ij} H_i^{t-1}\right);$$

//(Equation 1) Process of the $i^{th}$ node in the $t^{th}$ iteration
for i=0 to n-1://traversal among n nodes pred$_i$=softmax($W_4 * H_i^T$);

//(Equation 2) Prediction probability of the $i^{th}$ node after T iterations optimize arg min$_{w1,w2,w3,w4}\Sigma_i$corss_entrep(pred$_i$,$y_i$)

//(Equation 3) Prediction probability of the $i^{th}$ node after T iterations where $\sigma$ represents a nonlinear transform function (such as Relu, Sigmoid, and Tan h), $W_1$, $W_2$, $W_3$ and $W_4$ represent weight matrices, $\alpha_{ij}$ represents a weight matrix for the $i^{th}$ node and the $j^{th}$ node (for example, set as a diagonal matrix), pred$_i$ represents a prediction probability of the $i^{th}$ node after T iterations, and corss_entrep represents a function used to calculate cross entropy."

In the previous example scenario, for step S206, the training the graphical structure model by using the labeled samples can include: optimizing the following equation by using a back-propagation algorithm and the labeled samples to obtain optimal $W_1$, $W_2$, $W_3$, and $W_4$:

arg min$_{w1,w2,w3,w4}\Sigma_i$corss_entrep(pred$_i$,$y_i$).

The optimization objective here is established based on the cross entropy of the prediction probability and the labeling result. It is worthwhile to note that, in addition to the cross entropy, actually the optimization objective can be established based on other parameters that can be used to measure consistency between the prediction probability and the labeling result. The optimization objective is to make the consistency between the prediction probability and the labeling result as high as possible.

The previous equations 1, 2, and 3 are only examples and are not unique solutions. For example, in Equation 1, terms of $F_i$, $E_{ij}$, and $H_i^{t-1}$ can be transformed through multiplication, exponentiation, or logarithm, or they can be combined, or one of them can be deleted. For another example, in Equation 2, function softmax can be replaced with another applicable normalization function, etc.

Further, after the graphical structure model is trained, embedding vectors and/or prediction probabilities of an existing sample and a new sample can be calculated through forward propagation by using the trained graphical structure model. Further, the calculated embedding vector and/or prediction probability can be used for a sample-related service. For example, the embedding vector is used as input of another model (for example, re-integration is performed in combination with supervised, unsupervised, or reinforcement learning), or the embedding vector or the prediction probability is directly used to determine a property of a corresponding sample. Abnormal account prevention and control is used as an example. For example, when a prediction probability of a certain account is higher than a specific threshold, the account can be determined as an abnormal account, so prevention and control can be performed.

Figure 3:
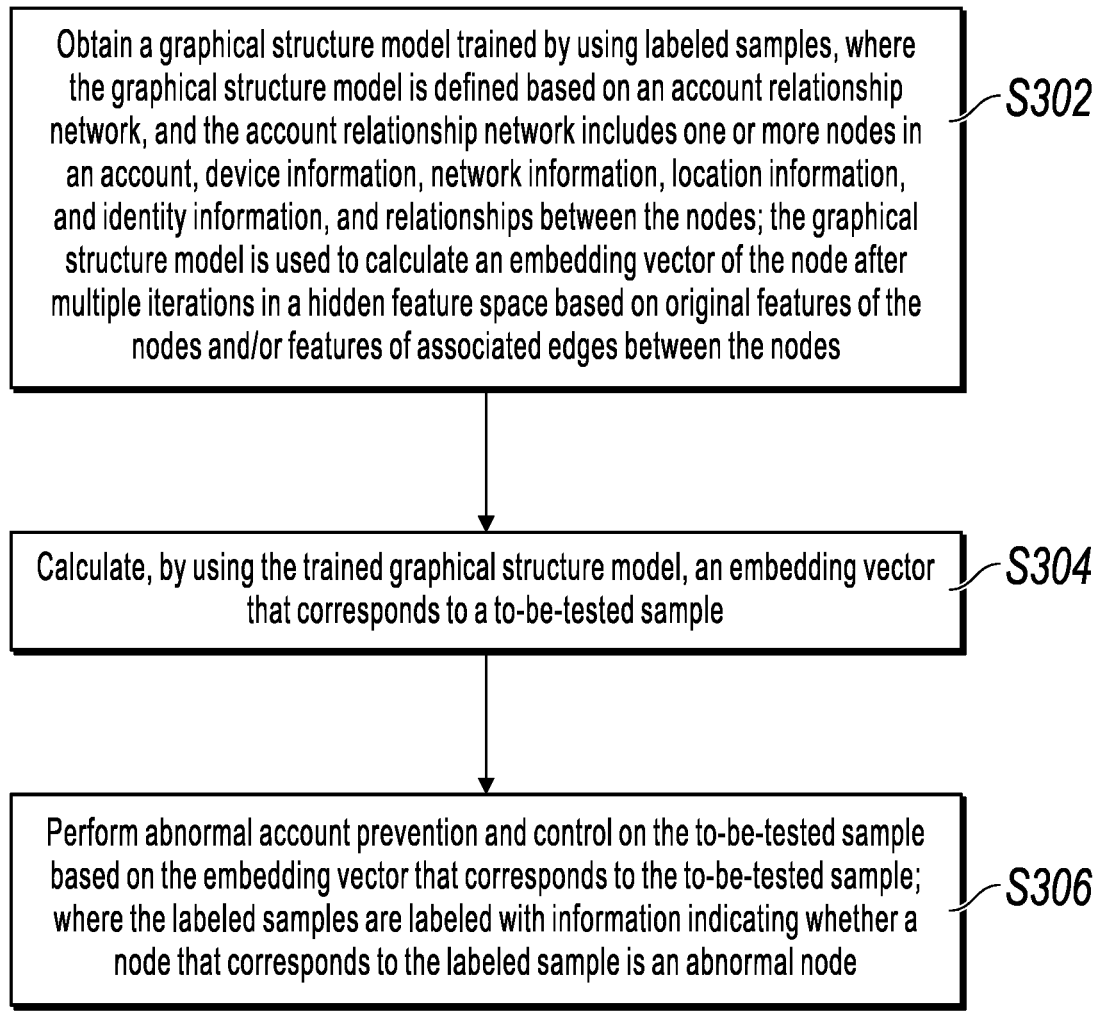
FIG. 3 is a schematic flowchart illustrating a method for abnormal account prevention and control based on a graphical structure model, according to an implementation of the present specification.

Based on the same idea, an implementation of the present specification further provides a method for abnormal account prevention and control based on a graphical structure model. FIG. 3 is a schematic flowchart of the method for abnormal account prevention and control. The procedure in FIG. 3 includes the following steps:

S302. Obtain a graphical structure model trained by using labeled samples, where the graphical structure model is defined based on an account relationship network, and the account relationship network includes one or more nodes in an account, device information, network information, location information, and identity information, and relationships between the nodes; the graphical structure model is used to calculate an embedding vector of the node after multiple iterations in a hidden feature space based on original features of the nodes and/or features of associated edges between the nodes.

In the implementation of the present specification, the graphical structure model in FIG. 3 is trained by using the method in FIG. 2. To understand the method in FIG. 3, reference can be made to the description of FIG. 2.

S304. Calculate, by using the trained graphical structure model, an embedding vector that corresponds to a to-be-tested sample.

S306. Perform abnormal account prevention and control on the to-be-tested sample based on the embedding vector that corresponds to the to-be-tested sample; where the labeled samples are labeled with information indicating whether a node that corresponds to the labeled sample is an abnormal node.

In practice, the prediction probability can visually represent the possibility that an account involved in a sample is an abnormal account. Therefore, for step S306, a prediction probability that corresponds to the to-be-tested sample can be further calculated based on the embedding vector that corresponds to the to-be-tested sample and by using the trained graphical structure model, and then abnormal account prevention and control is performed on the to-be-tested sample based on the prediction probability that corresponds to the to-be-tested sample. For example, assume that a certain to-be-tested sample is an account, if a calculated prediction probability that corresponds to the account is greater than a specified threshold, it can be determined that the account is an abnormal account, and then the account can be frozen, deregistered, etc.

Figure 4:
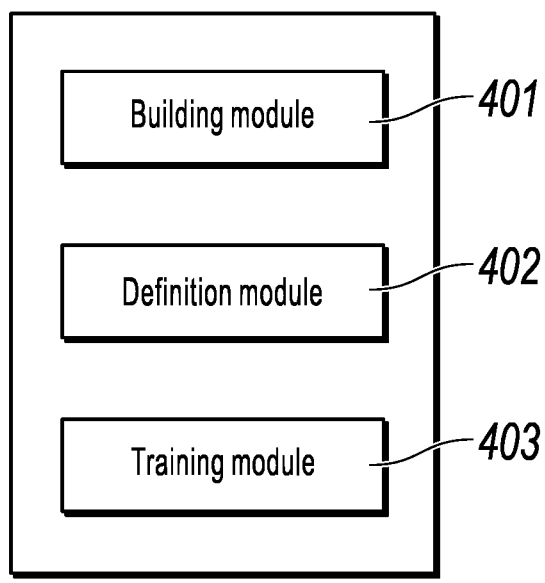
FIG. 4 is a schematic structural diagram illustrating a graphical structure model training apparatus that corresponds to FIG. 2, according to an implementation of the present specification.
Figure 5:
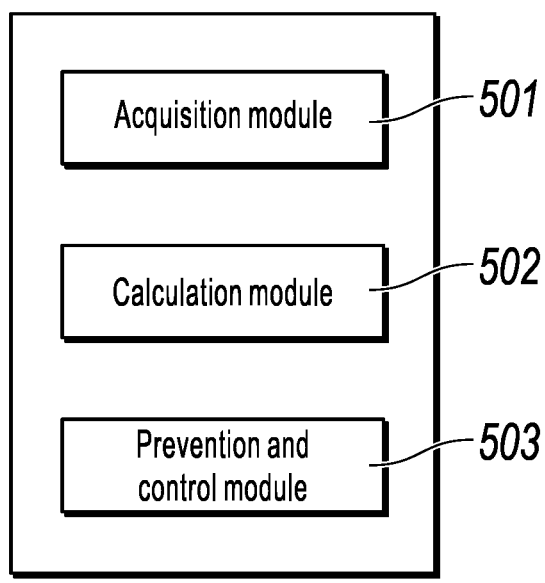
FIG. 5 is a schematic structural diagram illustrating an apparatus for abnormal account prevention and control based on a graphical structure model that corresponds to FIG. 3, according to an implementation of the present specification.

Based on the same idea, an implementation of the present specification further provides apparatuses that correspond to the previous methods, as shown in FIG. 4 and FIG. 5.

FIG. 4 is a schematic structural diagram illustrating a graphical structure model training apparatus that corresponds to FIG. 2, according to an implementation of the present specification. The apparatus includes: a building module 401, configured to build an account relationship network based on data relating to account registration and/or authentication, where the account relationship network includes one or more nodes in an account, device information, network information, location information, and identity information, and relationships between the nodes; a definition module 402, configured to define a graphical structure model based on the account relationship network, where the graphical structure model is used to calculate an embedding vector of the node after multiple iterations in a hidden feature space based on original features of the nodes and/or features of associated edges between the nodes; and a training module 403, configured to train the graphical structure model by using labeled samples, where the labeled samples are labeled with information indicating whether a node that corresponds to the labeled sample is an abnormal node.

FIG. 5 is a schematic structural diagram illustrating an apparatus for abnormal account prevention and control based on a graphical structure model that corresponds to FIG. 3, according to an implementation of the present specification. The apparatus includes: an acquisition module 501, configured to obtain a graphical structure model trained by using labeled samples, where the graphical structure model is defined based on an account relationship network, and the account relationship network includes one or more nodes in an account, device information, network information, location information, and identity information, and relationships between the nodes; the graphical structure model is used to calculate an embedding vector of the node after multiple iterations in a hidden feature space based on original features of the nodes and/or features of associated edges between the nodes; a calculation module 502, configured to calculate, by using the trained graphical structure model, an embedding vector that corresponds to a to-be-tested sample; and a prevention and control module 503, configured to perform abnormal account prevention and control on the to-be-tested sample based on the embedding vector that corresponds to the to-be-tested sample; where the labeled samples are labeled with information indicating whether a node that corresponds to the labeled sample is an abnormal node.

Optionally, the graphical structure model is further used to calculate a prediction probability of the node based on the embedding vector, where the prediction probability represents the probability that the node is an abnormal node; and that the prevention and control module 503 performs abnormal account prevention and control on the to-be-tested sample based on the embedding vector that corresponds to the to-be-tested sample includes: the prevention and control module 503 calculates a prediction probability that corresponds to the to-be-tested sample by using the trained graphical structure model based on the embedding vector that corresponds to the to-be-tested sample; and performs abnormal account prevention and control on the to-be-tested sample based on the prediction probability that corresponds to the to-be-tested sample.

Optionally, the account relationship network is built based on data relating to account registration and/or authentication.

Optionally, the account relationship network includes one or a combination of more of the following networks: an association network of an account and an international mobile equipment identity (IMEI), an association network of an account and a media access control (MAC) address, an association network of an account and an Internet protocol (IP) address, an association network of an account and a mobile phone number, an association network of an account and an international mobile subscriber identity (IMSI), an association network of an account and an email address, an association network of an account and an identity card number, an association network of an account and a bank card number, and an association network of an account and location information.

Optionally, the original feature includes at least one of the following types of data: node type, the number of registered accounts, the number of authenticated accounts, the number of abnormal accounts, and time-related statistical data; and the feature of the edge includes at least one of the following types of data involved in a node that is connected to the edge: behavior occurrence time, behavior consumption time, and behavior failure times, where the behavior includes registration behavior and/or authentication behavior.

Optionally, an embedding vector of the node after the $t^{th}$ iteration in the hidden feature space is calculated based on the original feature of the node, a feature of an edge of the node that is associated with another node, and an embedding vector of the node after the $(t-1)^{th}$ iteration in the hidden feature space.

Optionally, the calculating an embedding vector of the node after multiple iterations in a hidden feature space based on original features of the nodes and features of associated edges between the nodes includes: the calculation module 502 calculates the embedding vector of the node after multiple iterations in the hidden feature space based on the following equation:

$$H_i^t = \sigma\left(W_1 F_i + W_2 \sum_{j \in N_i} E_{ij} + W_3 \sum_{j \in N_i} \alpha_{ij} H_j^{t-1}\right);$$

where $H_i^t$ represents an embedding vector of an $i^{th}$ node after the $t^{th}$ iteration in the hidden feature space, $\sigma$ represents a nonlinear transform function, $W_1$, $W_2$, and $W_3$ represent weight matrices, $F_i$ represents an original feature of the $i^{th}$ node, $E_{ij}$ represents a feature of an edge of the $i^{th}$ node that is associated with a $j^{th}$ node, $N_i$ represents a set including neighboring nodes of the $i^{th}$ node, and $\alpha_{ij}$ as represents a weight matrix for the $i^{th}$ node and the $j^{th}$ node.

Optionally, the calculating a prediction probability of the node based on the embedding vector includes: the calculation module 502 calculates the prediction probability of the node based on the following equation:

$$pred_i = \text{softmax}(W_4 * H_i^T);$$

where $pred_i$ represents a prediction probability of the $i^{th}$ node after T iterations, and $W_4$ represents a weight matrix.

Optionally, the training the graphical structure model by using the labeled samples includes: training the graphical structure model by using the labeled samples and targeting the maximization of consistency between the prediction probability and a corresponding sample labeling result.

Optionally, the training the graphical structure model by using the labeled samples includes: using a back-propagation algorithm and the labeled samples to optimize arg $\min_{w_1,w_2,w_3,w_4} \Sigma_i$ corss_entrep($pred_i$, $y_i$) to obtain optimal $W_1$, $W_2$, $W_3$, and $W_4$; where corss_entrep represents a function used to calculate cross entropy.

Based on the same idea, an implementation of the present specification further provides a graphical structure model training device that corresponds to FIG. 2. The device includes: at least one processor; and a memory communicatively connected to the at least one processor; where the memory stores an instruction that can be executed by the at least one processor, and the instruction is executed by the at least one processor, to enable the at least one processor to: build an account relationship network based on data relating to account registration and/or authentication, where the account relationship network includes one or more nodes in an account, device information, network information, location information, and identity information, and relationships between the nodes; define a graphical structure model based on the account relationship network, where the graphical structure model is used to calculate an embedding vector of the node after multiple iterations in a hidden feature space based on original features of the nodes and/or features of associated edges between the nodes; and train the graphical structure model by using labeled samples, where the labeled samples are labeled with information indicating whether a node that corresponds to the labeled sample is an abnormal node.

Based on the same idea, an implementation of the present specification further provides a device for abnormal account prevention and control based on a graphical structure model that corresponds to FIG. 3. The device includes: at least one processor; and a memory communicatively connected to the at least one processor; where the memory stores an instruction that can be executed by the at least one processor, and the instruction is executed by the at least one processor, to enable the at least one processor to: obtain a graphical structure model trained by using labeled samples, where the graphical structure model is defined based on an account relationship network, and the account relationship network includes one or more nodes in an account, device information, network information, location information, and identity information, and relationships between the nodes; the graphical structure model is used to calculate an embedding vector of the node after multiple iterations in a hidden feature space based on original features of the nodes and/or features of associated edges between the nodes; calculate, by using the trained graphical structure model, an embedding vector that corresponds to a to-be-tested sample; and perform abnormal account prevention and control on the to-be-tested sample based on the embedding vector that corresponds to the to-be-tested sample; where the labeled samples are labeled with information indicating whether a node that corresponds to the labeled sample is an abnormal node.

Based on the same idea, an implementation of the present specification further provides a non-volatile computer storage medium that corresponds to FIG. 2, where the non-volatile computer storage medium stores a computer executable instruction, and the computer executable instruction is set to: build an account relationship network based on data relating to account registration and/or authentication, where the account relationship network includes one or more nodes in an account, device information, network information, location information, and identity information, and relationships between the nodes; define a graphical structure model based on the account relationship network, where the graphical structure model is used to calculate an embedding vector of the node after multiple iterations in a hidden feature space based on original features of the nodes and/or features of associated edges between the nodes; and train the graphical structure model by using labeled samples, where the labeled samples are labeled with information indicating whether a node that corresponds to the labeled sample is an abnormal node.

Based on the same idea, an implementation of the present specification further provides a non-volatile computer storage medium that corresponds to FIG. 3, where the non-volatile computer storage medium stores a computer executable instruction, and the computer executable instruction is set to: obtain a graphical structure model trained by using labeled samples, where the graphical structure model is defined based on an account relationship network, and the account relationship network includes one or more nodes in an account, device information, network information, location information, and identity information, and relationships between the nodes; the graphical structure model is used to calculate an embedding vector of the node after multiple iterations in a hidden feature space based on original features of the nodes and/or features of associated edges between the nodes; calculate, by using the trained graphical structure model, an embedding vector that corresponds to a to-be-tested sample; and perform abnormal account prevention and control on the to-be-tested sample based on the embedding vector that corresponds to the to-be-tested sample; where the labeled samples are labeled with information indicating whether a node that corresponds to the labeled sample is an abnormal node.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-tasking and parallel processing can be advantageous.

The implementations in the present specification are described in a progressive way. For same or similar parts of the implementations, references can be made to the implementations. Each implementation focuses on a difference from other implementations. Especially, an apparatus implementation, a device implementation, a non-volatile computer storage medium implementation are basically similar to a method implementation, and therefore is described briefly; for related parts, reference is made to partial descriptions in the method implementation.

The apparatus, the device, and the non-volatile computer storage medium provided in the implementations of the present specification correspond to the method. Therefore, the apparatus, the device, and the non-volatile computer storage medium also have beneficial technical effects similar to a beneficial technical effect of the corresponding method. The beneficial technical effect of the method is described in detail above, so the beneficial technical effects of the corresponding apparatus, device, and non-volatile computer storage medium are not described here again.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a calculating device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present specification, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
   obtaining a graphical structure model trained with labeled samples, wherein:
     the graphical structure model is defined based on a relationship network,
     the relationship network comprises a plurality of nodes and edges,
     the plurality of nodes represent entities in the relationship network,
     the edges correspond to relationships between adjacent nodes,
     each labeled sample comprises a label indicating whether a corresponding node of the graph structure model has a property, wherein the property indicates that the corresponding node is abnormal and brings risks to a platform which builds the relationship network which is used for abnormal account prevention,
     the graphical structure model is configured to iteratively calculate, for at least one node of the plurality of nodes, an embedding vector of the at least one node in a hidden feature space based on an original feature of the at least one node and/or a feature of an edge associated with the at least one node, wherein the embedding vector reflects a feature that is embedded in the hidden feature space, and
     the graphical structure model is further configured to calculate, for the at least one node of the plurality of nodes, a prediction probability based on the embedding vector of the at least one node, wherein the prediction probability represents a probability that the at least one node has the property that indicates that the at least one node is abnormal;
   calculating, using the trained graphical structure model, a first embedding vector that corresponds to a to-be-tested sample;
   calculating, using the trained graphical structure model, a first prediction probability that corresponds to the to-be-tested sample based on the first embedding vector that corresponds to the to-be-tested sample; and
   performing control on the to-be-tested sample based on whether the calculated first prediction probability that corresponds to the to-be-tested sample exceeds a specified threshold.

2. The computer-implemented method of claim 1, wherein the relationship network is built based on data relating to account registration and/or authentication.

3. The computer-implemented method of claim 1, wherein the relationship network comprises one or more of the following networks: an association network of an account and an international mobile equipment identity (IMEI), an association network of an account and a media access control (MAC) address, an association network of an account and an Internet protocol (IP) address, an association network of an account and a mobile phone number, an association network of an account and an international mobile subscriber identity (IMSI), an association network of an account and an email address, an association network of an account and an identity card number, an association network of an account and a bank card number, and an association network of an account and location information.

4. The computer-implemented method of claim 1, wherein the original feature of the at least one node comprises at least one of the following types of data: node type, a number of registered accounts, a number of authenticated accounts, a number of risky accounts, and time-related statistical data; and
   wherein the feature of the edge comprises at least one of the following types of data involved in a node that is connected to the edge: occurrence time of a behavior, consumption time of the behavior, and a number of failure times of the behavior, wherein the behavior comprises registration behavior and/or authentication behavior.

5. The computer-implemented method of claim 1, wherein the embedding vector of the at least one node after a $t^{th}$ iteration in the hidden feature space is calculated based on the original feature of the at least one node, the feature of the edge associated with the at least one node that is associated with another node, and an embedding vector of the at least one node after a $(t-1)^{th}$ iteration in the hidden feature space.

6. The computer-implemented method of claim 1, wherein the plurality of nodes represent one or more of the following: account information, device information, network information, location information, and identity information.

7. The computer-implemented method of claim 1, wherein iteratively calculating the embedding vector of the at least one node in the hidden feature space based on the original feature of the at least one node and the feature of the edges associated with the at least one node comprises:
  iteratively calculating the embedding vector of the at least one node in the hidden feature space based on the following equation:

$$H_i^t = \sigma\left(W_1 F_i + W_2 \sum_{j \in N_i} E_{ij} + W_3 \sum_{j \in N_i} \alpha_{ij} H_i^{t-1}\right),$$

wherein $H_i^t$ represents the embedding vector of an $i^{th}$ node after a $t^{th}$ iteration in the hidden feature space, $\sigma$ represents a nonlinear transform function, $W_1$, $W_2$, and $W_3$ represent weight matrices, $F_i$ represents the original feature of the $i^{th}$ node, $E_{ij}$ represents the feature of the edge associated with the $i^{th}$ node that is associated with a $j^{th}$ node, $N_i$ represents a set comprising neighboring nodes of the $i^{th}$ node, and $\alpha_{ij}$ represents a weight matrix for the $i^{th}$ node and the $j^{th}$ node.

8. The computer-implemented method of claim 1, wherein training the graphical structure model with the labeled samples comprises:
  targeting a maximization of a consistency between the prediction probability and a corresponding sample labeling.

9. A non-transitory, computer-readable medium storing one or more instructions executable by a computer system to perform operations comprising:
  obtaining a graphical structure model trained with labeled samples, wherein:
    the graphical structure model is defined based on a relationship network,
    the relationship network comprises a plurality of nodes and edges,
    the plurality of nodes represent entities in the relationship network,
    the edges correspond to relationships between adjacent nodes,
    each labeled sample comprises a label indicating whether a corresponding node of the graph structure model has a property, wherein the property indicates that the corresponding node is abnormal and brings risks to a platform which builds the relationship network which is used for abnormal account prevention,
    the graphical structure model is configured to iteratively calculate, for at least one node of the plurality of nodes, an embedding vector of the at least one node in a hidden feature space based on an original feature of the at least one node and/or a feature of an edge associated with the at least one node, wherein the embedding vector reflects a feature that is embedded in the hidden feature space, and
    the graphical structure model is further configured to calculate, for the at least one node of the plurality of nodes, a prediction probability based on the embedding vector of the at least one node, wherein the prediction probability represents a probability that the at least one node has the property that indicates that the at least one node is abnormal;
  calculating, using the trained graphical structure model, a first embedding vector that corresponds to a to-be-tested sample;
  calculating, using the trained graphical structure model, a first prediction probability that corresponds to the to-be-tested sample based on the first embedding vector that corresponds to the to-be-tested sample; and
  performing control on the to-be-tested sample based on whether the calculated first prediction probability that corresponds to the to-be-tested sample exceeds a specified threshold.

10. The non-transitory, computer-readable medium of claim 9, wherein the relationship network is built based on data relating to account registration and/or authentication.

11. The non-transitory, computer-readable medium of claim 9, wherein the relationship network comprises one or more of the following networks: an association network of an account and an international mobile equipment identity (IMEI), an association network of an account and a media access control (MAC) address, an association network of an account and an Internet protocol (IP) address, an association network of an account and a mobile phone number, an association network of an account and an international mobile subscriber identity (IMSI), an association network of an account and an email address, an association network of an account and an identity card number, an association network of an account and a bank card number, and an association network of an account and location information.

12. The non-transitory, computer-readable medium of claim 9, wherein the original feature of the at least one node comprises at least one of the following types of data: node type, a number of registered accounts, a number of authenticated accounts, a number of risky accounts, and time-related statistical data; and
  wherein the feature of the edge comprises at least one of the following types of data involved in a node that is connected to the edge: occurrence time of a behavior, consumption time of the behavior, and a number of failure times of the behavior, wherein the behavior comprises registration behavior and/or authentication behavior.

13. The non-transitory, computer-readable medium of claim 9, wherein the embedding vector of the at least one node after a $t^{th}$ iteration in the hidden feature space is calculated based on the original feature of the at least one node, the feature of the edge associated with the at least one node that is associated with another node, and an embedding vector of the at least one node after a $(t-1)^{th}$ iteration in the hidden feature space.

14. The non-transitory, computer-readable medium of claim 9, wherein the plurality of nodes represent one or more of the following: account information, device information, network information, location information, and identity information.

15. The non-transitory, computer-readable medium of claim 9, wherein iteratively calculating the embedding vector of the at least one node in the hidden feature space based on the original feature of the at least one node and the feature of the edges associated with the at least one node comprises:
  iteratively calculating the embedding vector of the at least one node in the hidden feature space based on the following equation:

$$H_i^t = \sigma\left(W_1 F_i + W_2 \sum_{j \in N_i} E_{ij} + W_3 \sum_{j \in N_i} \alpha_{ij} H_i^{t-1}\right),$$

wherein $H_i^t$ represents the embedding vector of an $i^{th}$ node after a $t^{th}$ iteration in the hidden feature space, σ represents a nonlinear transform function, $W_1$, $W_2$, and $W_3$ represent weight matrices, $F_i$ represents the original feature of the $i^{th}$ node, $E_{ij}$ represents the feature of the edge associated with the $i^{th}$ node that is associated with a $j^{th}$ node, $N_i$ represents a set comprising neighboring nodes of the $i^{th}$ node, and $\alpha_{ij}$ represents a weight matrix for the $i^{th}$ node and the $j^{th}$ node.

16. The non-transitory, computer-readable medium of claim 9, wherein training the graphical structure model with the labeled samples comprises:
   targeting a maximization of a consistency between the prediction probability and a corresponding sample labeling.

17. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   obtaining a graphical structure model trained with labeled samples, wherein:
      the graphical structure model is defined based on a relationship network,
      the relationship network comprises a plurality of nodes and edges,
      the plurality of nodes represent entities in the relationship network,
      the edges correspond to relationships between adjacent nodes,
      each labeled sample comprises a label indicating whether a corresponding node of the graph structure model has a property, wherein the property indicates that the corresponding node is abnormal and brings risks to a platform which builds the relationship network which is used for abnormal account prevention,
      the graphical structure model is configured to iteratively calculate, for at least one node of the plurality of nodes, an embedding vector of the at least one node in a hidden feature space based on an original feature of the at least one node and/or a feature of an edge associated with the at least one node, wherein the embedding vector reflects a feature that is embedded in the hidden feature space, and
      the graphical structure model is further configured to calculate, for the at least one node of the plurality of nodes, a prediction probability based on the embedding vector of the at least one node, wherein the prediction probability represents a probability that the at least one node has the property that indicates that the at least one node is abnormal;
   calculating, using the trained graphical structure model, a first embedding vector that corresponds to a to-be-tested sample;
   calculating, using the trained graphical structure model, a first prediction probability that corresponds to the to-be-tested sample based on the first embedding vector that corresponds to the to-be-tested sample; and
   performing control on the to-be-tested sample based on whether the calculated first prediction probability that corresponds to the to-be-tested sample exceeds a specified threshold.

18. The computer-implemented system of claim 17, wherein the relationship network is built based on data relating to account registration and/or authentication.

19. The computer-implemented system of claim 17, wherein the embedding vector of the at least one node after a $t^{th}$ iteration in the hidden feature space is calculated based on the original feature of the at least one node, the feature of the edge associated with the at least one node that is associated with another node, and an embedding vector of the at least one node after a $(t-1)^{th}$ iteration in the hidden feature space.

20. The computer-implemented system of claim 17, wherein training the graphical structure model with the labeled samples comprises:
   targeting a maximization of a consistency between the prediction probability and a corresponding sample labeling.

* * * * *